United States Patent
Livne et al.

(10) Patent No.: US 9,432,410 B2
(45) Date of Patent: Aug. 30, 2016

(54) SYSTEM AND METHOD FOR EXTENDING SCIM / SERVICE BROKER PROCESSING IMS INITIAL FILTER CRITERIA (IFC) FOR PIPELINE PROCESSING

(75) Inventors: Shlomo Livne, Ra'anana (IL); Dima Polsky, Jerusalem (IL); Vladimir Furman, Givaat-Ada (IL); Renana Seidman, Ra'anana (IL); Marina Bunin, Ahituv (IL); Avi Zohary, Rosh-Haain (IL); Yoel Amram, Rechovot (IL); Amnon Heiman, Tel-Aviv (IL); Nadav Kadosh, Givaataim (IL); Tzach Livyatan, Tel-Aviv (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 854 days.

(21) Appl. No.: 13/584,418

(22) Filed: Aug. 13, 2012

(65) Prior Publication Data

US 2014/0046999 A1    Feb. 13, 2014

(51) Int. Cl.
*G06F 15/16* (2006.01)
*H04L 29/06* (2006.01)

(52) U.S. Cl.
CPC ....... *H04L 65/1016* (2013.01); *H04L 65/1063* (2013.01); *H04L 65/40* (2013.01)

(58) Field of Classification Search
None
See application file for complete search history.

(56) References Cited

U.S. PATENT DOCUMENTS

| 7,032,002 B1* | 4/2006 | Rezvani | H04L 29/06 370/429 |
|---|---|---|---|
| 2005/0273517 A1* | 12/2005 | Patrick | H04L 63/20 709/238 |
| 2009/0193131 A1* | 7/2009 | Shi | H04L 65/1063 709/229 |
| 2013/0066940 A1* | 3/2013 | Shao | H04L 67/1025 709/201 |
| 2013/0111550 A1* | 5/2013 | Naveh | G06F 9/468 726/3 |

FOREIGN PATENT DOCUMENTS

WO    2012088150 A2    6/2012

OTHER PUBLICATIONS

International Search Report dated Oct. 24, 2013 for Application No. PCT/US2013/054570, 13 pages.

(Continued)

*Primary Examiner* — Mohamed Ibrahim
(74) *Attorney, Agent, or Firm* — Tucker Ellis LLP (57) ABSTRACT

In accordance with various embodiments, systems and methods that integrate pipeline processing into a SCIM are provided. Such a system can include a plurality of applications, executing on one or more application servers. Each application server operates on one or more microprocessors. The system can further include a SCIM, which is operable to manage activation of the plurality of applications in one or more application chains. Each application chain can include pipeline blocks comprising two or more back-to-back applications and the two or more applications in each pipeline block can be activated in a same order in a forward and a backwards direction.

17 Claims, 7 Drawing Sheets

(56) References Cited

OTHER PUBLICATIONS

Worley Avaya D., "Interopateration of Application Server B2BUAs with SIP Call Control: draft-worley-sipcore-b2bua-passthru-00.txt", Internet Engineering Task Force, retrieved Oct. 29, 2013, 16 pages. <http://tools.ietf.org/pdf/draft-worley-sipcore-b2bua-passthru-00.pdf>.

3GPP: "$3^{rd}$ Generation Partnership Project; Technical Specification Group Core Network and Terminals; IP Multimedia (IM) session handling; IM call model; Stage 2 (Release 11)", retrieved Oct. 29, 2013, 69 pages. <http://www.3gpp.org/ftp/Specs/html-info/23218.htm>.

* cited by examiner

SYSTEM AND METHOD FOR EXTENDING SCIM / SERVICE BROKER PROCESSING IMS INITIAL FILTER CRITERIA (IFC) FOR PIPELINE PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to an application orchestration using an orchestration engine and in particular to a system and method for extending SCIM/service broker processing IMS initial filter criteria (IFC) for pipeline processing.

BACKGROUND

Orchestration engines, such as a Service Control Interaction Management (SCIM) enable users to use multiple applications from multiple vendors to create custom solutions, without tying the user to a particular vendor for all applications and services. Standard SCIMs build an application chain on initial request. Currently, following the initial request SCIMs are limited to process applications according to the signaling traffic in the network direction and do not support pipelining, where applications are activated in the same order both in the forward and backwards directions. However, users need the ability to chain applications one after the other (according to the network direction), as well as the ability to define a certain subset of applications in the chain to work in pipeline (irrespective of the network direction).

Previous attempts to provide these features have resulted in the creation of single large applications which include all of the needed functionality; however this negates the purpose of using a SCIM to chain smaller applications together. Alternatively, applications can be added to the chain multiple times, so that these applications will be executed in the desired order in both directions, but this solution is not scalable.

SUMMARY

In accordance with various embodiments, systems and methods that integrate pipeline processing into a SCIM are provided. Such a system can include a plurality of applications, executing on one or more application servers. Each application server operates on one or more microprocessors. The system can further include a SCIM, which is operable to manage activation of the plurality of applications in one or more application chains. Each application chain can include multiple pipeline blocks, each comprising of two or more applications. Each pipeline block of two or more applications can be activated in a same order in a forward and a backwards direction.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Figure 1:
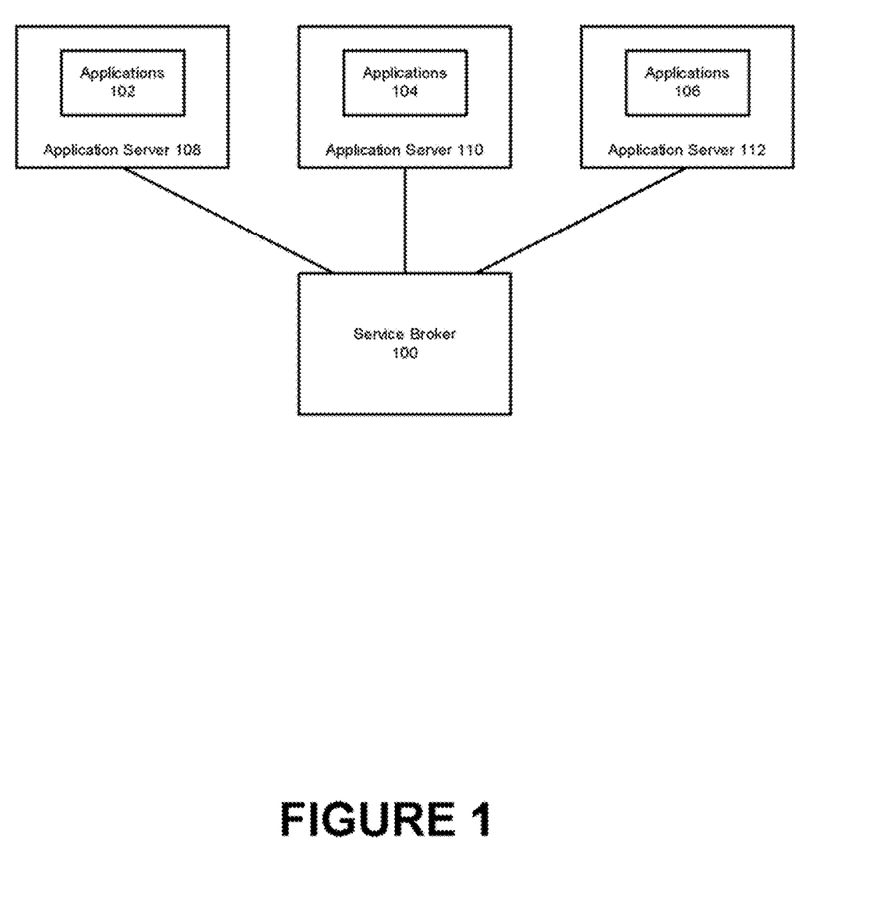
FIG. 1 shows a Service Control Interaction Management (SCIM)/Service Broker.

FIG. 1 shows a Service Control Interaction Management (SCIM)/Service Broker. The SCIM 100 can orchestrate, or chain together, multiple applications 102-106 across different application servers 108-112. Each of the plurality of application servers can include a plurality of applications. SCIM orchestration is done according to the signaling from the network.

Figure 2:
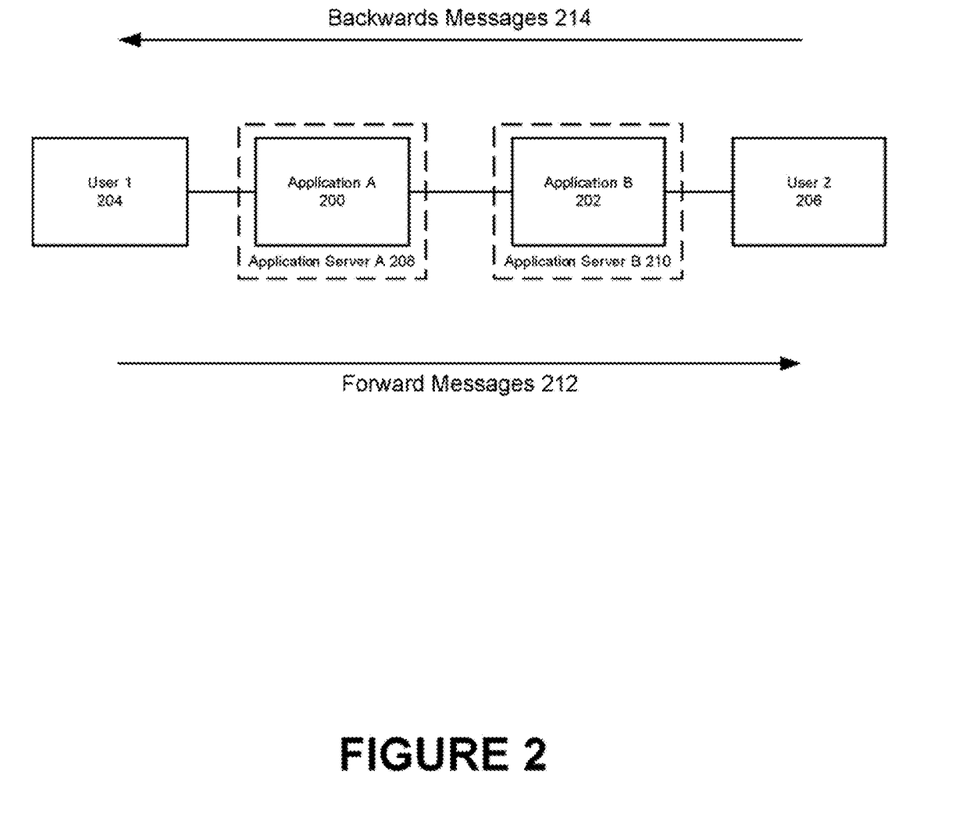
FIG. 2 shows an example of orchestrating applications by a service broker.

FIG. 2 shows an example of orchestrating applications by a service broker. As shown in FIG. 2, two applications Application A 200 and Application B 202 are orchestrated to facilitate communication between User 1 204 and User 2 206. Application A can be executing on a first application server, Application Server A 208, and Application B can be executing on a second application server, Application Server B 210. The flow of information through the applications is according to the flow in the network:

Messages from the originating party, in this example User 1 204, are called forward messages 212 and flow from Application A 200 to Application B 202.

Messages from the terminating party, in this example User 2 206, are called backward messages 214 and flow from Application B 202 to Application A 200.

However, there are instances where it is preferable for processing to always occur in the same order, for example when a message is sent in either direction the message would be processed by Application A 200 and then Application B 202. This method of processing events in which information is processed always in the same order, is called a pipeline. In pipeline processing, applications can be grouped into blocks, these applications can then be executed in the same order regardless of the direction of processing. Applications added to the pipeline are back-to-back (B2B) applications. B2B applications are characterized in that whatever they receive, they send out again. One example of a B2B application is a traffic logger, whatever it receives it sends back (without opening additional legs, which are discussed in more detail below).

An example of such an instance in which a pipeline approach is preferred is the case of charging. In this case, the pipeline should include Location Normalization (e.g., determining whether the user is roaming), Charging (e.g., how much the user can talk, or how much is left in the user's account), and BillShock (e.g., provide notice to the user that his account is low)—in any case of signaling (backward or forward messages), the order remains the same.

Although the SCIM/Service Broker provides a means to orchestrate and distribute signaling traffic between applications, it does not allow a pipeline approach. Using the standards there are two solutions:

Create one application that includes all of the logic (e.g. in our case Normalization, Charging, and BillShock). However, this is contrary to the purpose SCIM which was added to allow chaining of applications instead of requiring all processing logic to be included in a single application.

Alternatively, applications can be added twice in the chain and be made to function only in a certain direction of signaling (e.g. in our case Location (1), BillShock (2), Charging (1,2), BillShock (1), Location (2)—in forward direction (1) application will work, in backward direction (2) application will work). However, this solution is not scalable.

To address these concerns, in accordance with an embodiment of the invention, an orchestration engine (e.g., SCIM/service broker) can be enhanced to include: an extension to the initial filter criteria (IFC) to support definition of grouping applications; methods to create a chain of applications; and methods to transfer information in the chain of applications. Each of these are discussed in turn, below.

IFC Extension

In accordance with an embodiment of the invention, the initial filter criteria (IFC) can be extended using a new element called UnidirectionGroup (with the group ID). IFC is an XML format which defines the criteria on which applications should be activated (e.g., the orchestration logic). An extension point inside the IFC can be used to specify that a particular set of sequential applications are a unidirectional group, which will cause the group to be processed in a pipeline. The unidirectional group extension includes a group ID which is used to identify which applications are members of which group. Applications in the group are executed sequentially in the order in which they are listed in the IFC.

Chaining Applications

Figure 3:
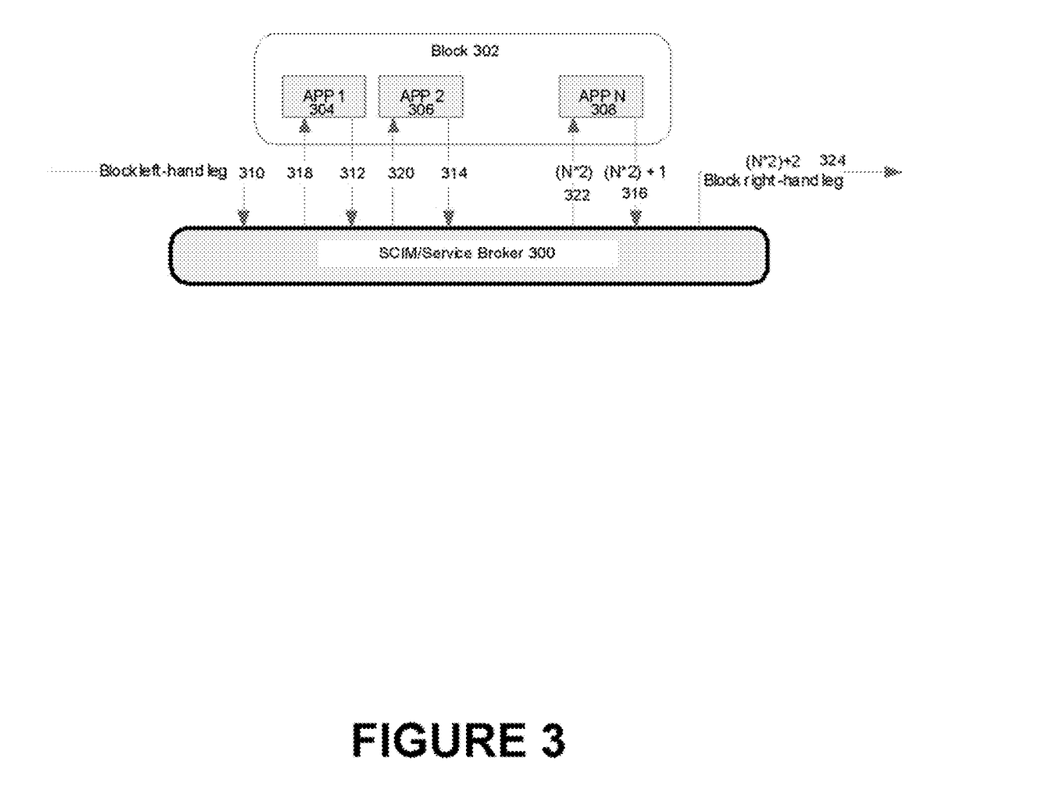
FIG. 3 shows an example of a pipeline forward message leg mapping, in accordance with an embodiment of the invention.

FIG. 3 shows an example of pipeline leg mapping, in accordance with an embodiment of the invention. A SCIM/Service Broker 300 typically orchestrates a block 302 of applications (APP 1 304, APP 2 306, and APP N 308) using pairs of back-to-back (B2B) legs. For each initial incoming event, the SCIM 300 creates a leg that handles messages that belongs to that block. The OE 300 then finds the next application to route the message to and creates a peer B2B leg that handles events coming and going from the targeted application for that specific dialog.

As shown in FIG. 3, in pipeline orchestration there are a plurality of left-hand legs 310, 312, 314, and 316 and a plurality of right-hand legs 318, 320, 322, and 324. The block left-hand leg 310 is the leg that starts the pipeline orchestration, and the block right-hand leg 324 is the peer leg of the leg created for the last application in the pipeline. Each left-hand leg is mapped to a newly created B2B leg (B2B right hand leg). For example: leg 310 maps to leg 318, leg 312 to leg 320, . . . , and leg (N*2)+1 to leg (N*2)+2. For right-hand side legs, given that:

M—is the number of legs participating in the pipeline (including pipeline left-hand and pipeline right-hand legs); and i—is the leg ID; then leg(i) maps to leg((i+3) mod M), i.e., leg i would be mapped to leg ((i+3) mod M).

The leg mappings are used to route traffic, i.e., if information is received on one leg, the mapping indicates to which leg should the traffic be forwarded. For the example shown in FIG. 3, in a pipeline orchestration, the leg mappings are:

Left hand side leg mapping:
310→318
312→320
314→322
316→324

Right hand side leg mapping:
324→312
318→314
320→316
322→310

In accordance with the above, in the forward direction (according to the left hand side leg mapping), traffic flows from one application to the next via each consecutive leg pair. In the backwards direction, however, traffic is routed to the "backwards" leg on the next application in the block. For example, if APP 1 sends a message in the backwards direction along leg 318, that message will be sent to the next application in the block, which in this case is APP 2. In the forward direction, messages sent to APP 2 travel along leg 320, but because this message is traveling in the backwards direction, it will be sent along leg 314. Other traffic in the backwards direction will be similarly routed according to the right hand side leg mapping shown above.

Alternatively, in a non pipeline orchestration (e.g., regular SCIM mode), the mappings are symmetric, i.e., traffic routing in the forward direction and backwards direction is mirrored:

Left hand side leg mapping is:
310→318
312→320
314→322
316→324

And right side mapping is:
324→316
322→314
320→312
318→310

Figure 4:
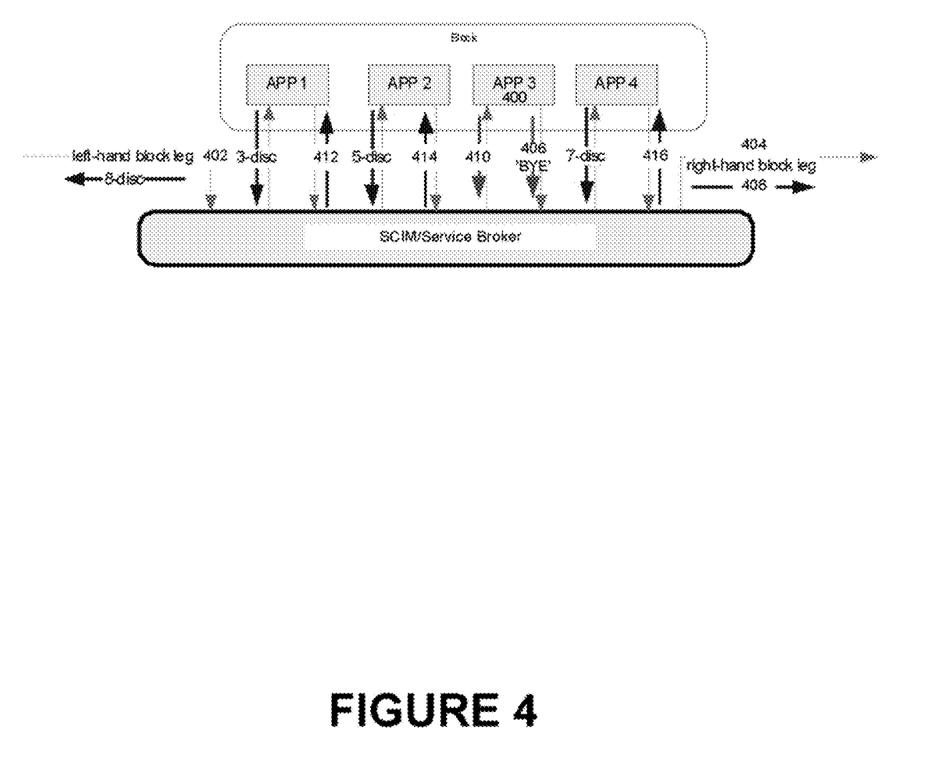
FIG. 4 shows an example of an application in a pipeline disconnecting, in accordance with an embodiment of the invention.

FIG. 4 shows an example of an application in a pipeline, disconnecting, in accordance with an embodiment of the invention. When an application in the middle of the pipeline initiates a disconnect, for example APP 3 400, the block left hand leg 402 and block right hand leg 404 need to be disconnected. If the disconnect is received on APP 3's right hand leg 406, then a disconnect message 408 can be sent to the block right hand leg 404. If the disconnect is received on the application left hand leg 410, then a disconnect request 412, 414, and 416 can be propagated to the right leg of each application in the block (412, 414, 416) starting from the left most application, while skipping the disconnecting application legs during propagation. Once the disconnect event from APP 4 is received, it is routed back to the block left hand leg 402.

Transferring Information in the Chain of Applications

Figure 5:
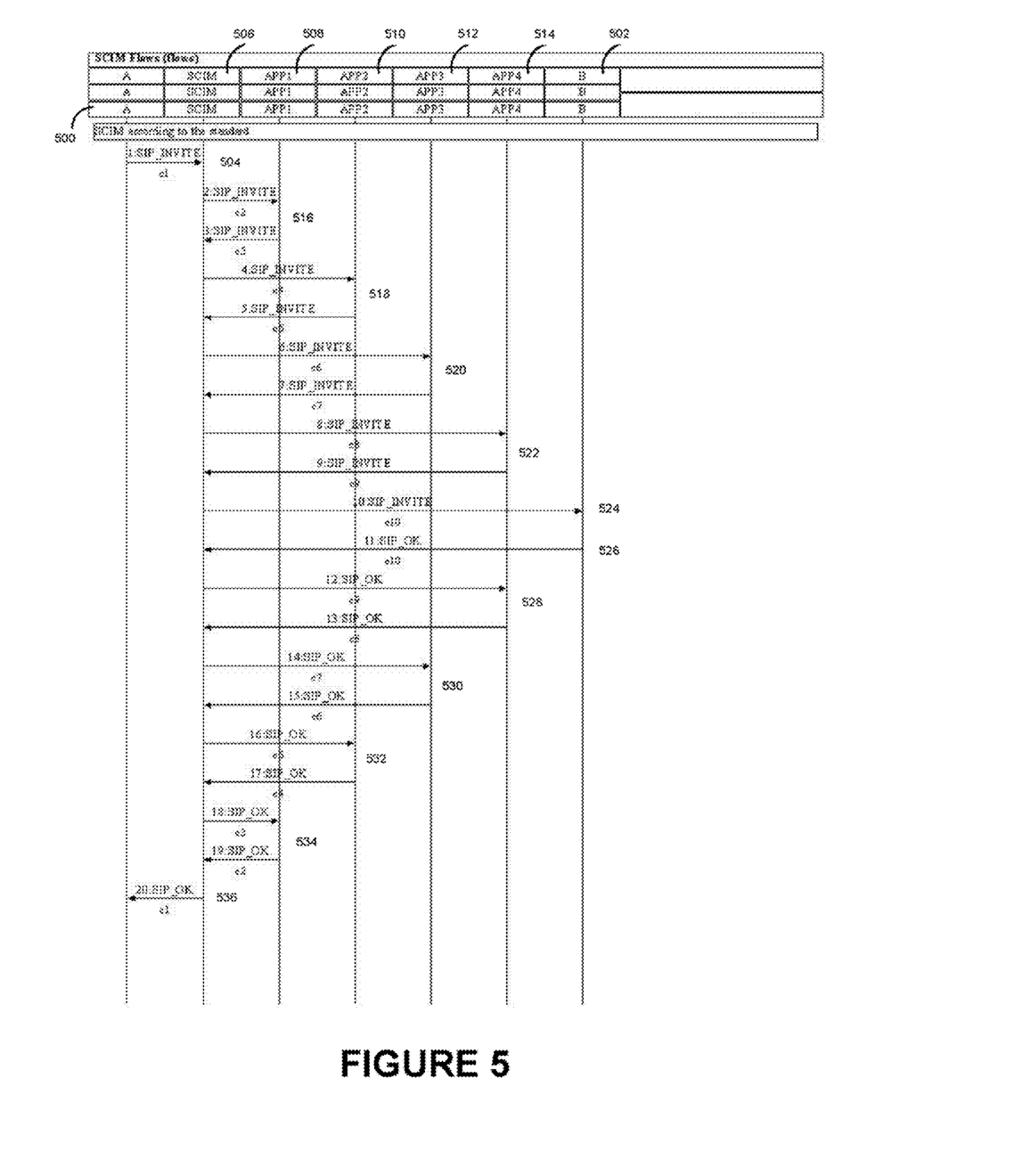
FIG. 5 shows a flow diagram of standard SCIM processing.

FIG. 5 shows a flow diagram of standard SCIM processing. As shown in FIG. 5, a first user A 500 calls a second User B 502. Processing begins when user A 500 sends an INVITE message 504 which is received by SCIM 506. The SCIM then orchestrates the message through four applications (APP1 508, APP2 510, APP3 512 and APP4 514). At 516, the INVITE message is sent by the SCIM 506 to APP1 508 which then sends the message back to the SCIM 506. According to the orchestration logic, at 518 the SCIM 506 then sends the message to the next application, APP2 510, which send the message back to the SCIM 506. The SCIM 506 then similarly communicates the message to APP3 512 and then APP4 514, at 520 and 522, respectively, before finally sending the message to user B 502 at 524. Elements 516 to 524 in the flow diagram represent the setup of the connection from user A 500 to user B 502. When user B 502 answers the call, an OK message is returned to user A 500. Since this diagram shows the flow in a standard SCIM case, processing proceeds backwards through the applications: the OK message is sent to the SCIM at 526, which then sends the message to APP4 514 at 528, APP3 512 at 530, APP2 510 at 532 and APP1 508 at 534. Once the applications have finished processing, the OK message is finally returned to user A 500 at 536.

Figure 6:
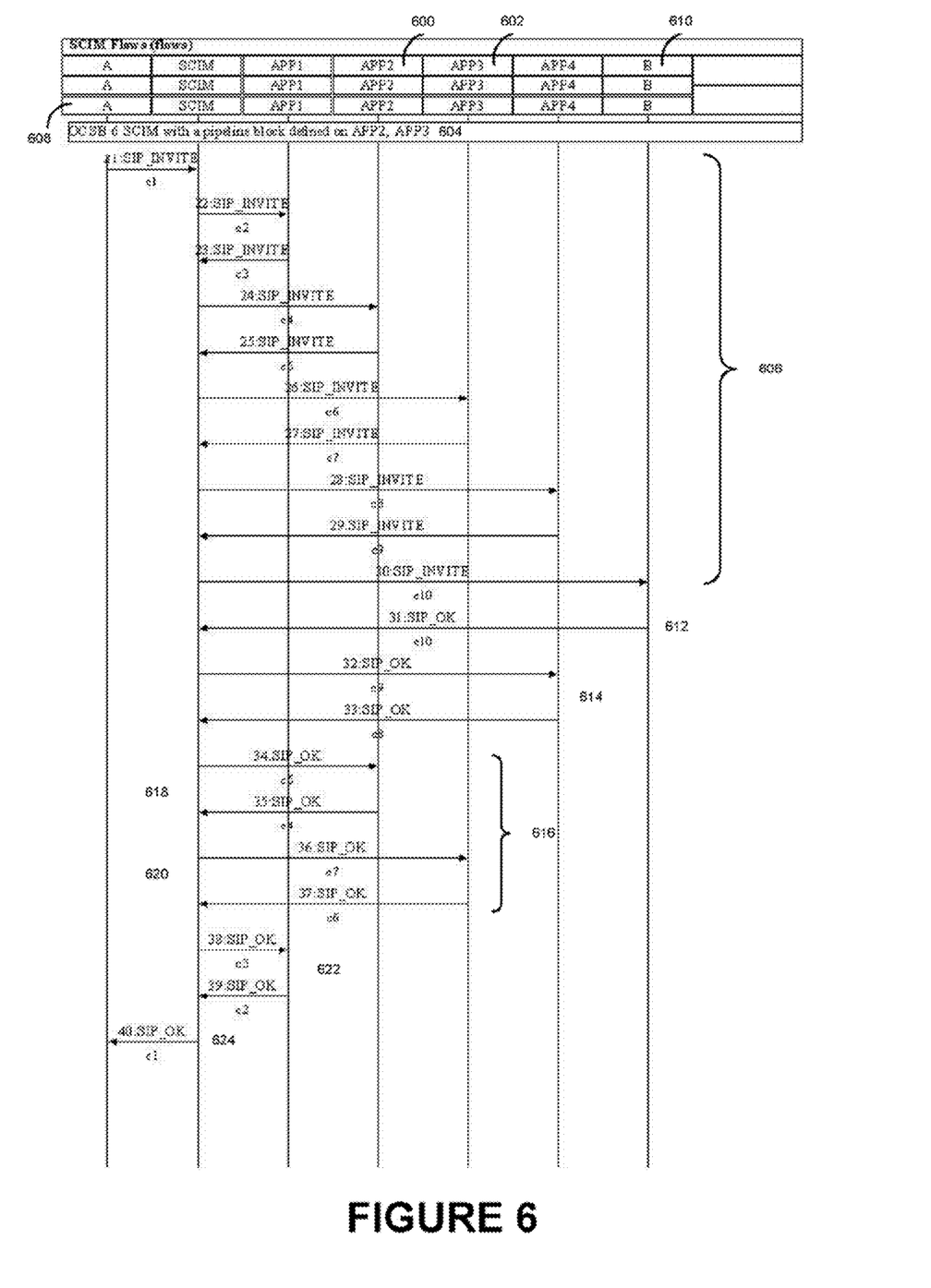
FIG. 6 shows a flow diagram of pipeline processing using the SCIM, in accordance with an embodiment of the invention.

FIG. 6 shows a flow diagram of pipeline processing using the SCIM, in accordance with an embodiment of the invention. As shown in FIG. 6, APP2 600 and APP3 602 have been grouped 604, so they will be processed as a pipeline block. Processing in the forward direction 606, where the INVITE message is sent from user A 608 to user B 610, can proceed as shown in FIG. 5. However, in the backwards direction, processing proceeds differently, according to the pipeline block. At 612, an OK message is returned from user B 610 to the SCIM. At 614 the SCIM sends the message to APP4 which returns it to the SCIM. Processing then reaches the APP2-APP3 block 616. Unlike in FIG. 5, where APP3 602 was activated followed by APP2 600, in FIG. 6, the applications in the pipeline block are activated in the same order as in the forward direction. Thus, at 618 APP2 600 is activated, followed by APP3 602 at 620. This way, if APP3 602 needs to information that APP2 600 generates, that information will be available. Following the pipeline block, processing continues as before, with APP1 activated at 622 and the OK message returned to user A at 624.

By incorporating pipeline processing into the SCIM, new applications can be orchestrated which previously were not compatible. Under previous systems, if a first application needs particular information generated by a second application, the first application may not be compatible with the system because it could not be guaranteed that the information from the second application would be available. However, as shown in FIG. 6, embodiments of the present invention extend the SCIM to allow for pipeline processing which ensures that the applications are activated in a particular order while offering a scalable solution.

Although in the embodiments shown above a single pipeline block is shown in a particular application chain, the SCIM can be used to interleave multiple pipeline blocks within any given application chain.

Figure 7:
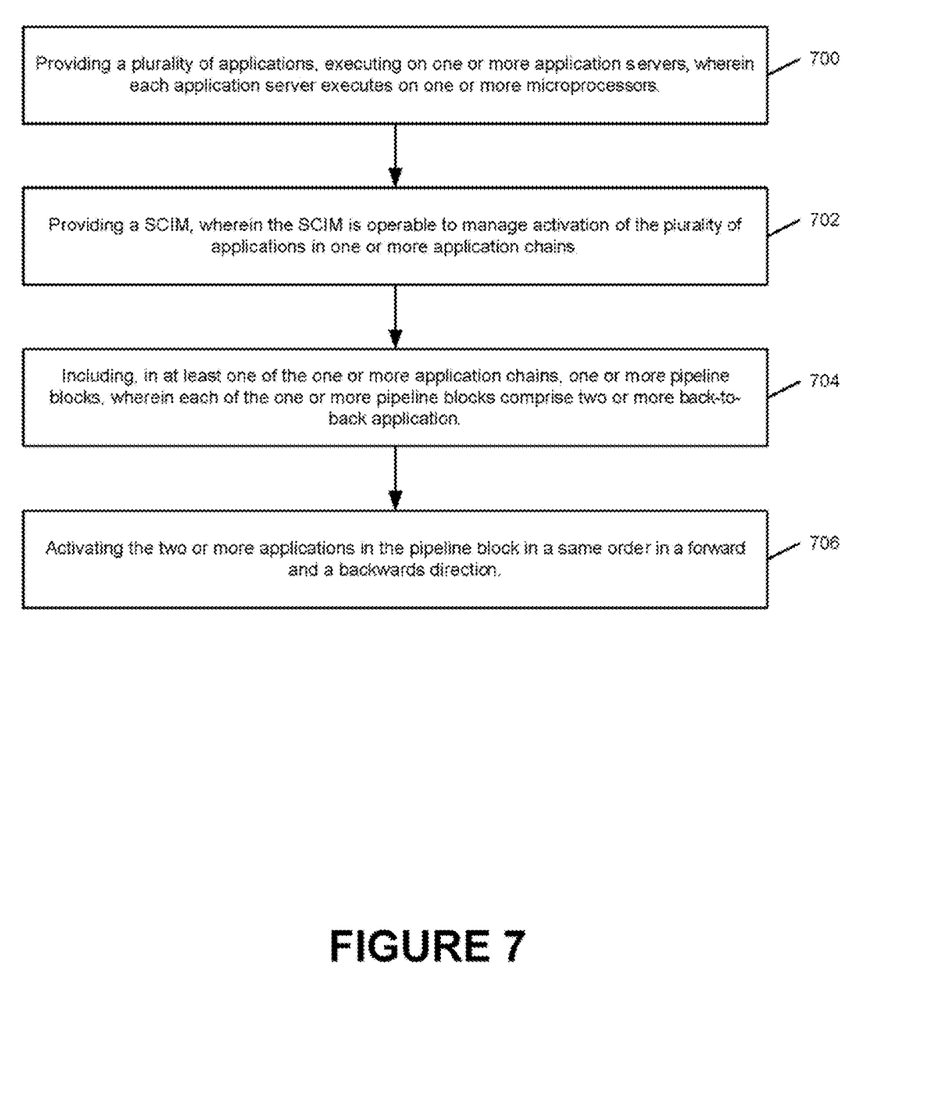
FIG. 7 shows a method that integrates pipeline processing into an orchestration engine, in accordance with an embodiment of the invention.

FIG. 7 shows a method that integrates pipeline processing into a SCIM, in accordance with an embodiment of the invention. At step 700, a plurality of applications, executing on one or more application servers, are provided. Each application server includes one or more microprocessors. At step 702, a SCIM is provided which is operable to manage activation of the plurality of applications in one or more application chains. At step 704, at least one application chain is provided which includes one or more pipeline blocks, wherein each block comprises two or more applications. At step 706, the two or more applications in the pipeline block are activated in a same order in a forward and a backwards direction.

The method shown in FIG. 7 can further comprise including, in the SCIM, initial filter criteria (IFC) which defines the logic that determines an order in which the plurality of applications are executed and further defines which applications are grouped in the pipeline block. Additionally, each application chain can include a plurality of different pipeline blocks, and each of the plurality of applications in the blocks is a back-to-back application. Furthermore, when an application in the pipeline initiates a disconnect, disconnect messages are sent to a left hand leg and a right hand leg of the application chain.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system that integrates pipeline processing into a service broker environment, the system comprising:

a plurality of applications, executing on one or more application servers, wherein each application server of the one or more application servers operates on one or more microprocessors; and a service broker, wherein the service broker is operable to manage activation of the plurality of applications in one or more application chains;

wherein at least one application chain of the one or more application chains selectively comprises a pipeline block comprising two or more applications of the plurality of applications;

wherein the service broker orchestrates processing of the pipeline block including activating the two or more applications of the plurality of applications in the pipeline block in a same order for messages routed via the pipeline block in both forward and backward directions of the messages relative to the pipeline block;

wherein the service broker comprises filter criteria comprising a unidirectional group extension element associated with the pipeline block, the unidirectional group extension element indicating that the two or more applications of the plurality of applications which are grouped in the pipeline block are to be executed in the same order for the messages routed via the pipeline block in both the forward and the backward directions of the messages relative to the pipeline block.

2. The system of claim 1, wherein the filter criteria comprises initial filter criteria (IFC) which defines logic that determines an order in which the plurality of applications are executed and further defines which of said applications are grouped in the pipeline block.

3. The system of claim 2, wherein the IFC comprises, in an application server element, the unidirectional group extension element.

4. The system of claim 1, wherein each said application chain selectively includes a plurality of different pipeline blocks.

5. The system of claim 1, wherein each said application of the plurality of applications in a pipeline block is a back-to-back application.

6. The system of claim 1, wherein when an application in the pipeline block initiates a disconnect, disconnect messages are sent to a left hand leg and a right hand leg of the application chain of said one or more application chains.

7. A method that integrates pipeline processing into a service broker environment, the method comprising:

providing a plurality of applications, executing on one or more application servers, wherein each application server executes on one or more microprocessors;

providing a service broker, wherein the service broker is operable to manage activation of the plurality of applications in one or more application chains, in forward and backward directions;

including, in at least one application chain of the one or more application chains, a pipeline block, wherein the pipeline block comprises two or more applications of the plurality of applications;

orchestrating processing, by the service processor, of the pipeline block by activating the two or more applications of the plurality of applications in the pipeline block in a same order for messages routed via the pipeline block in both forward and backward directions of the messages relative to the pipeline block; and including, in the service broker, filter criteria comprising a unidirectional group extension element associated with the pipeline block, the unidirectional group extension element indicating that the two or more applications of the plurality of applications which are grouped in the pipeline block are to be executed in the same order for the messages routed via the pipeline block in both the forward and the backward directions of the messages relative to the pipeline block.

8. The method of claim 7, wherein:

the including, in the service broker, the filter criteria comprises including in the service broker an initial filter criteria (IFC) which defines the logic that determines an order in which the plurality of applications are executed and further defines which said applications are grouped in the pipeline block.

9. The method of claim 8, wherein the IFC comprises the unidirectional group element in an application server element.

10. The method of claim 7, further comprising including a plurality of different pipeline blocks in a single application chain.

11. The method of claim 7, wherein each of the plurality of applications in a pipeline block is a back-to-back application.

12. The method of claim 7, further comprising:

initiating a disconnect, by an application in the pipeline; and sending disconnect messages to a left hand leg and a right hand leg of the application chain.

13. A non-transitory computer readable storage medium including instructions stored thereon which, when executed by a computer, cause the computer to perform the steps of:

providing a plurality of applications, executing on one or more application servers, wherein each application server executes on one or more microprocessors;

providing a service broker, wherein the service broker is operable to manage activation of the plurality of applications in one or more application chains, in forward and backward directions;

including, in at least one application chain of the one or more application chains, a pipeline block, wherein the pipeline block comprises two or more applications of the plurality of applications;

orchestrating processing, by the service broker, of the pipeline block by activating the two or more applications of the plurality of applications in the pipeline block in a same order for messages routed via the pipeline block in both forward and backward directions of the messages relative to the pipeline block; and including, in the service broker, filter criteria comprising a unidirectional group extension element associated with the pipeline block, the unidirectional group extension element indicating that the two or more applications of the plurality of applications which are grouped in the pipeline block are to be executed in the same order for the messages routed via the pipeline block in both the forward and the backward directions of the messages relative to the pipeline block.

14. The non-transitory computer readable storage medium of claim 13, wherein:

the including, in the service broker, the filter criteria comprises including in the service broker an initial filter criteria (IFC) which defines the logic that determines an order in which the plurality of applications are executed and further defines which applications are grouped in pipeline blocks.

15. The non-transitory computer readable storage medium of claim 13, further comprising including, a plurality of different pipeline blocks in a single application chain.

16. The non-transitory computer readable storage medium of claim 13, wherein each of the plurality of applications in a pipe line block is a back-to-back application.

17. The non-transitory computer readable storage medium of claim 13, further comprising:
- initiating a disconnect, by an application in the pipeline; and
- sending disconnect messages to a left hand leg and a right hand leg of the application chain.

* * * * *